Sept. 22, 1931. M. J. WEBER 1,824,698
COMBINED LEVER AND COIL SPRING TYPE OF SCALE
Original Filed May 10, 1926 4 Sheets-Sheet 2

Inventor
Mathias J. Weber
By: Munday, Clarke & Carpenter
Att'ys

Sept. 22, 1931.  M. J. WEBER  1,824,698
COMBINED LEVER AND COIL SPRING TYPE OF SCALE.
Original Filed May 10, 1926   4 Sheets-Sheet 3
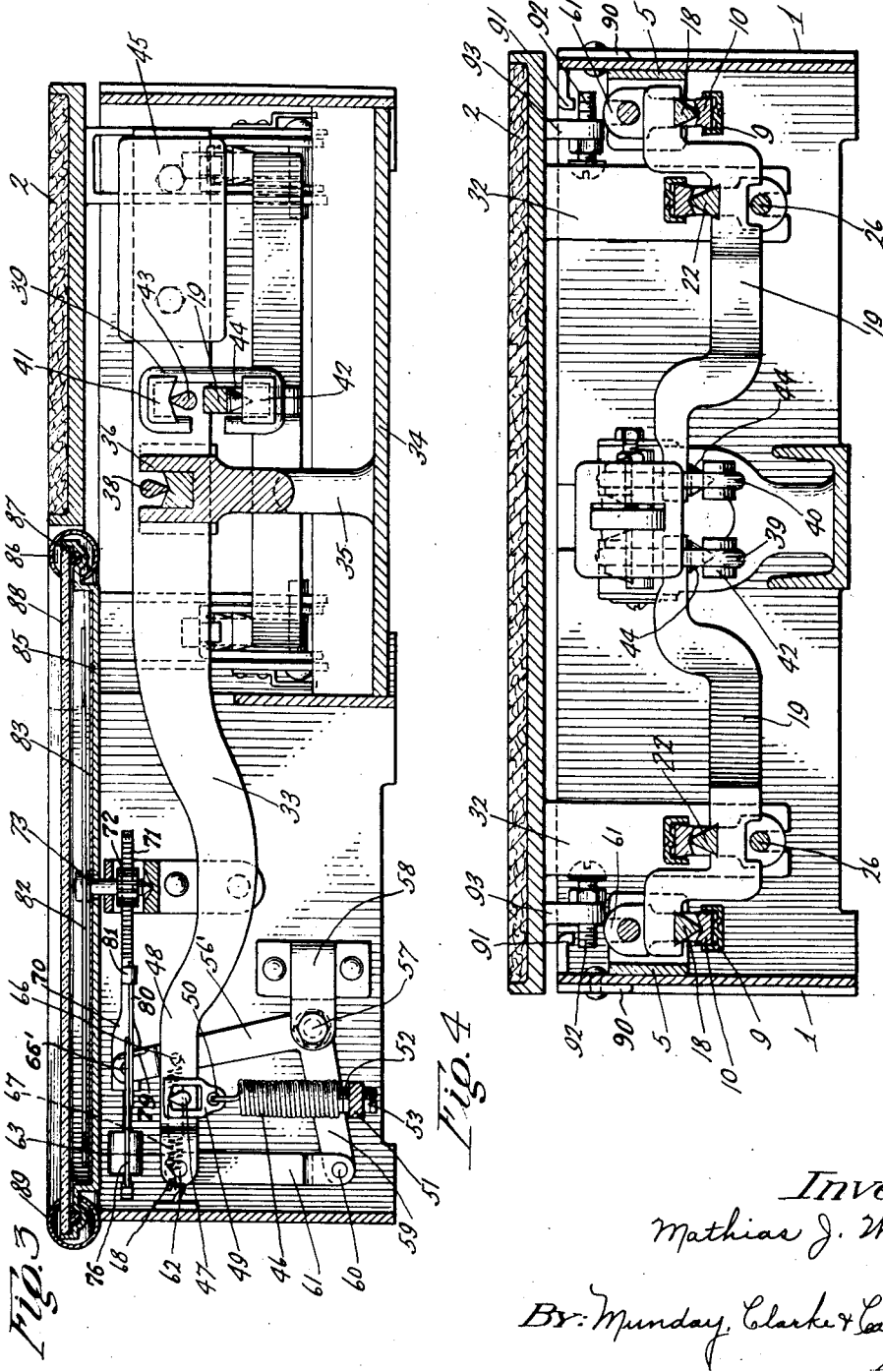
Inventor:
Mathias J. Weber
By: Munday, Clarke & Carpenter
Attys Sept. 22, 1931.  M. J. WEBER  1,824,698
COMBINED LEVER AND COIL SPRING TYPE OF SCALE
Original Filed May 10, 1926  4 Sheets-Sheet 4
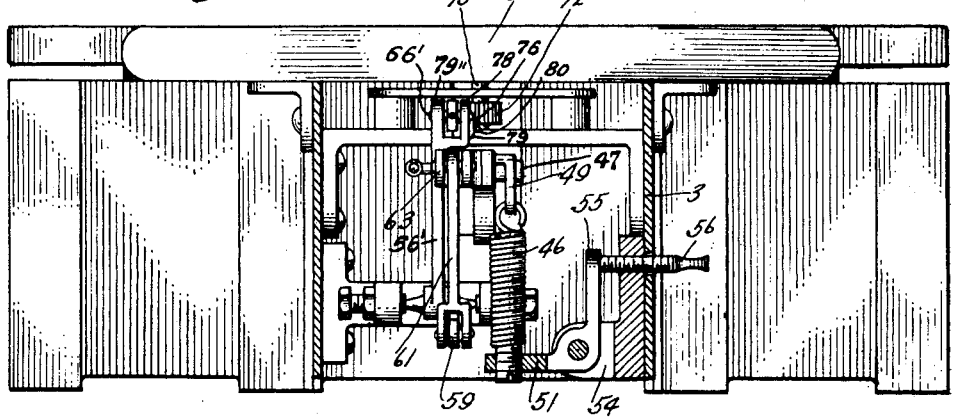
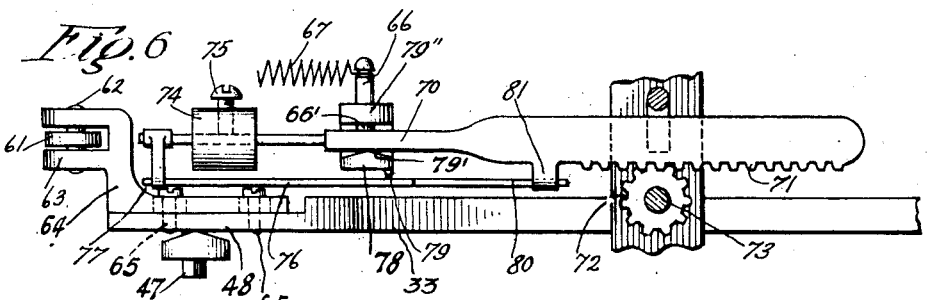
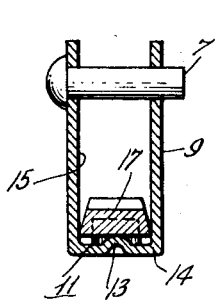
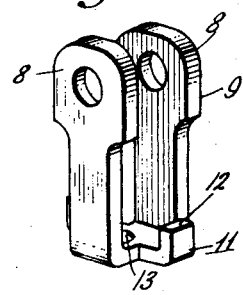
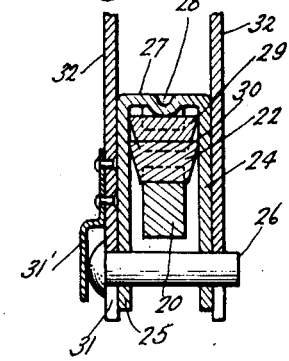
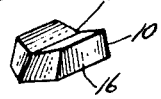
Inventor:
Mathias J. Weber
By: Munday, Clarke & Carpenter
Attys Patented Sept. 22, 1931

1,824,698

UNITED STATES PATENT OFFICE

MATHIAS J. WEBER, OF CHICAGO, ILLINOIS, ASSIGNOR TO HEALTHOMETER COMPANY, OF CHICAGO, ILLINOIS, A CORPORATION OF ILLINOIS

COMBINED LEVER AND COIL SPRING TYPE OF SCALE

Application filed May 10, 1926, Serial No. 107,864. Renewed August 14, 1931.

This invention relates to personal weighing scales, and refers more especially to a type of scale which may be placed on the floor and which is made rather shallow, so that a person may easily step upon the scale platform and, by looking down into the recording dial, may determine his own weight at a glance. The general type of the scale is disclosed in my prior Patent Number 1,382,-699, of June 28, 1921. Experience has shown that in scales of this type, it is necessary that the construction be quite rugged in order to withstand the jolts and jerks and uneven strains and stresses incidental to people stepping onto the platform of the scale. It is also essential that the registering mechanism be quite accurate, so as to indicate the correct weight. In the type of scale shown in my former patent, the scale platform was mounted on a vertical reciprocating rectangular frame, carried by a plurality of arms pivotally mounted within the casing, and actuating connections including relatively strong coil springs from this frame to the registering mechanism served to register the weight placed upon the platform. In such a construction, whenever an individual to be weighed steps unevenly upon the platform so as to cause the vertically mounted frame to shift laterally out of a true vertical path, this lateral movement, which is not a true weighing movement, is immediately transferred by means of the pivoted lever connections, to the registering mechanism so that the error is multiplied and indicated in the registering mechanism.

One of the objects of my present invention resides not only in overcoming all of these deficiencies in the scales of my former patent, but also in providing an improved scale of that character.

Another object of my present invention resides in providing a scale of the above mentioned character, in which the height of the casing and hence the distance of the scale platform from the floor, is materially reduced, whereby the person to be weighed may easily step upon the platform, and the scale as a whole is made more stable to prevent tipping and the like.

Another important object of my invention resides in constructing a substantially shallow scale of the type specified, having a relatively broad platform to prevent easy tipping of the scale, wherein the registering dial is mounted in substantially the same horizontal plane as the platform, whereby to provide a scale having all parts relatively close to the ground, while at the same time permitting the easy reading of the registered weight.

Still another object of my invention resides in providing a scale of the above character wherein the weighing platform will maintain itself in a horizontal plane irrespective of how it is stepped upon by the individual and wherein no lateral strains or stresses are set up during the depression of the scale platform, which can be transmitted to the registering mechanism, thereby eliminating heretofore existing sources of error in prior constructions of scales.

Another object of my invention resides in constructing the platform and weighing mechanism so that any tipping or tilting of the platform, due to sudden jars or jolts, or due to an individual placing his weight unevenly on the platform, is not registered on the dial, whereby accuracy of weighing is assured.

Another object of my invention resides in the provision of a scale of the above character, wherein friction and drag of the weighing mechanism and of the platform is reduced to a minimum, whereby accurate weighing is assured.

Still another object of my present invention resides in the provision of a relatively shallow scale, made possible by the use of overlying horizontally disposed levers, which interconnect the scale platform with the registering dial, together with the use of swinging pivotal mountings with knife edges for reducing friction to a minimum and maintainng the level of the scale platform during the registering operation.

Another object of my invention resides in the provision of a novel means for yieldingly maintaining the rack for shifting the dial pinion in mesh with the pinion, thereby eliminating back leash.

Yet another object of my present invention resides in providing means for maintaining the rack yieldingly in contact with the dial pinion, which means is constructed and arranged to eliminate to a minimum any drag or friction between the rack and the pinion.

Still another object of my present invention resides in providing a scale of the above character, wherein the weighing platform is operatively connected to a transversely disposed lever, which in turn is connected to a relatively small coiled spring, by which arrangement the necessity of using heavy coil springs for the weighing mechanism, as in my prior patented construction, is obviated.

Another object of my present invention resides in the improved means for assembling the weighing mechanism of my scale, and particularly in the construction whereby the platform is maintained in assembled relation to the weighing mechanism and casing.

Another object of my invention resides in the construction of the knife edges and bearings, and connections between the weighing levers, whereby friction is reduced to a minimum and universality of movement is provided.

Numerous other objects and advantages of the invention will be apparent as it is better understood from the following description, which taken in connection with the accompanying drawings, discloses a preferred embodiment thereof.

Fig. 3 is a side sectional view, on line 3—3 of Fig. 2.

Fig. 4 is a sectional view on line 4—4 of Fig. 2.

Fig. 5 is a section taken on line 5—5 of Fig. 2.

Fig. 6 is a detailed view of the spring mechanism for maintaining the rack in yielding engagement with the dial pinion.

Fig. 7 is a section on line 7—7 of Fig. 2.

Fig. 8 is a perspective view of one of the stirrups.

Fig. 9 is a perspective view of one of the bearings.

Fig. 10 is a section on line 10—10 of Fig. 2.

Figure 1:
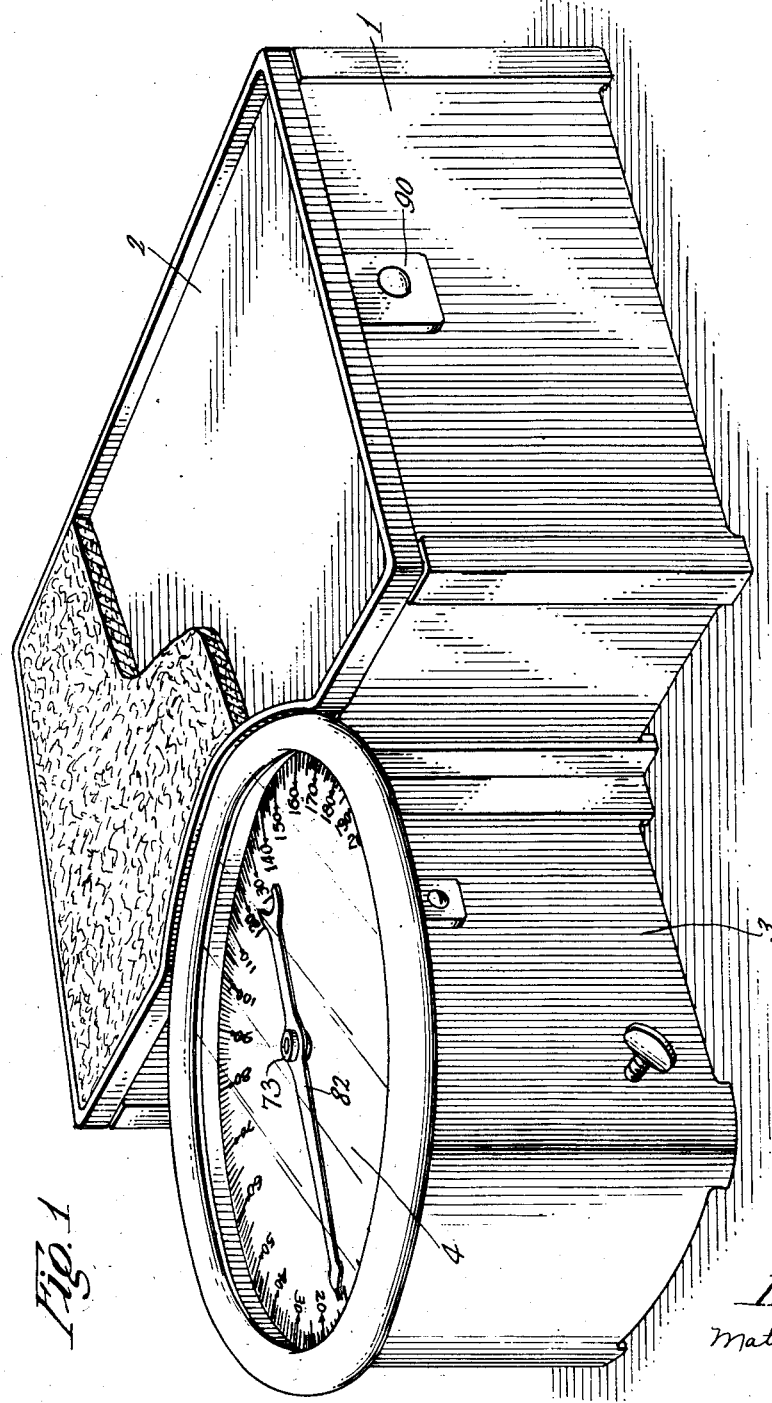
Fig. 1 is a perspective view of my improved scale.
Figure 2:
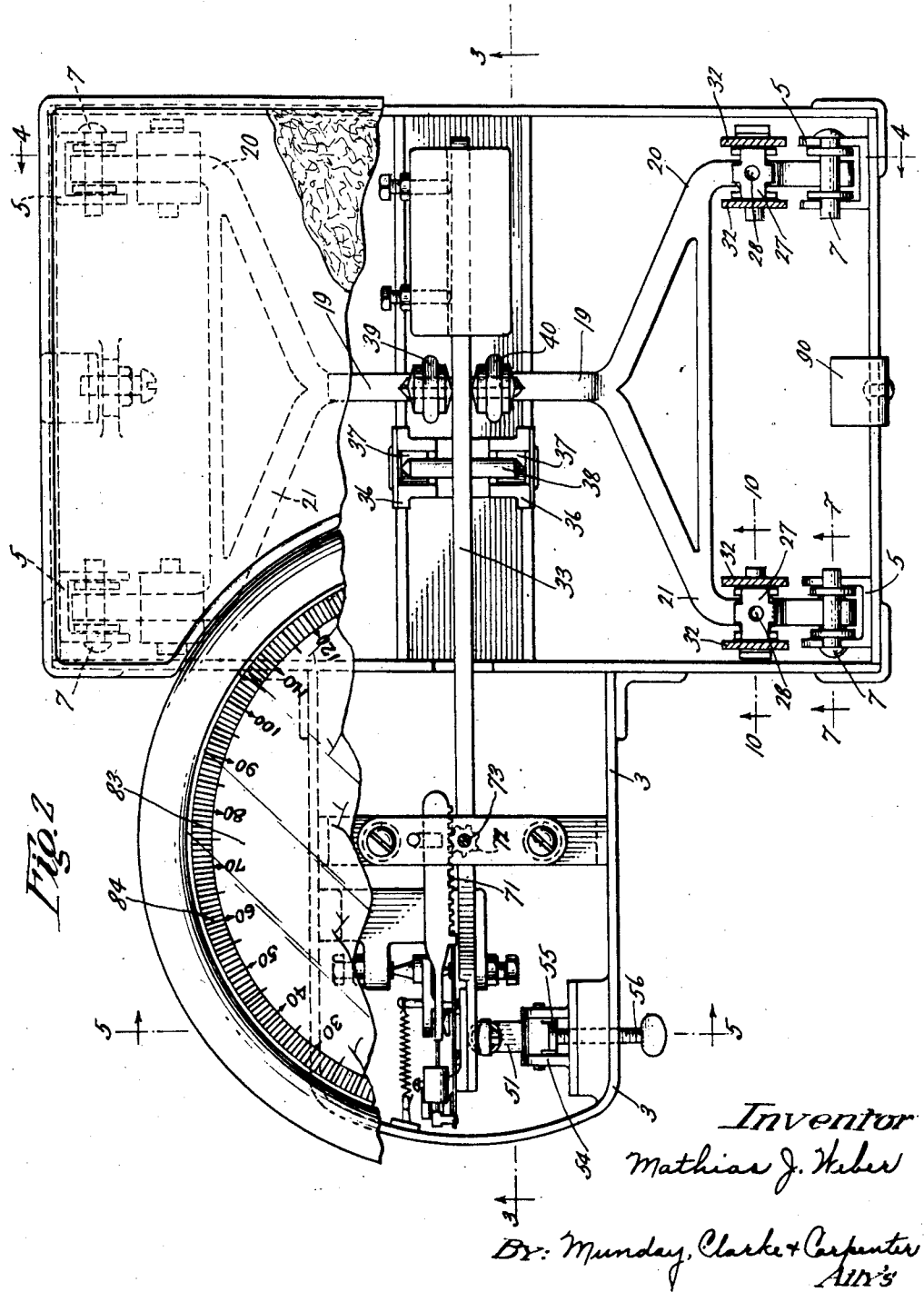
Fig. 2 is a plan view of my scale with parts broken away, showing the interior mechanism.

As plainly disclosed in Fig. 1 of the drawings, my improved scale comprises a metal casing 1, which is relatively long and shallow. This casing 1 is provided with a weighing platform 2 which covers the top of the casing. The casing is provided with an extension 3, either integral or otherwise, the top of which is closed by a dial 4, preferably arranged in a common plane with the platform 2. In this type of scale, which is popularly called the bathroom scale, one of the objects resides in providing a shallow mounting for the weighing mechanism, so that it is comparatively easy for the individual to step from the floor onto the weighing platform and when in weighing position on the platform, to look down into the horizontally disposed dial and view thereon the registered weight. By having a relatively shallow casing of substantial breadth, the stability of the scale is assured and all danger of the scale tipping when stepped upon is eliminated. In providing scales of this required dimension, many problems in constructional arrangement are encountered and therefore the weighing mechanism of the scale must be adapted to overcome these difficulties, and at the same time the weighing mechanism must provide accuracy and must eliminate errors liable to be transmitted to the dial indicator, due to jars or jolts or any possible twisting movement of the weighing platform. These latter are fundamental sources of inaccuracy which are liable to be present in weighing scales of this type. In my improved construction these sources of error are eliminated and a very strong, rugged and accurate scale is provided.

It will also be noted that by providing a shallow casing, which in the present instance has a major portion of substantially rectangular shape, with a lateral projection of minor dimension, it is possible to mount the generously dimensioned scale platform on the top of the rectangular portion to form a closure therefor and to mount the scale dial on the lateral projection of the casing, so that the scale dial lies in substantially the same horizontal plane as the platform. It will also be noticed that in carrying out this arrangement I provide the scale platform with a slight lateral recess to accommodate an arcuate portion of the scale dial which lies in the plane of the platform. Thus the dial and platform appear to be a continuous top or cover for the casing, whereas, in fact, the dial is slightly spaced from the casing at this recessed portion, whereby to permit the free up and down weighing movement of the platform. The foregoing construction, it will be appreciated, is not limited to a round scale dial or rectangular platform, as various contours and shapes may be used, the important feature of the invention residing rather in the construction of a shallow casing with the scale dial and weighing platform mounted relatively low to the ground and lying in a common horizontal plane, whereby to prevent tipping the casing and to permit the weighing platform to be used as a stool to be sat upon by the person being weighed, if desired, without any danger of the scale tipping over. With such a shallow construction, it is possible to make the platform of various dimensions and also the scale dial of generous dimensions, whereby permitting the use of relatively large weighing indicia on the dial, which may be easily read when the person is standing upon the scale. It will also be noted that in the present embodiment of my invention, the platform and dial form a complete closure for the top of the casing.

The casing 1 is provided with means for supporting the platform 2. In the present arrangement this means comprises a plurality of brackets 5, four in number, which are preferably U shaped and are rigidly mounted as by means of bolts or rivets on the side walls of the casing, being arranged in opposed pairs. These brackets are each formed with registering open ended slots or bearings, 6, adapted to receive pins 7. Each of these pins in turn passes through registering apertures in the ears 8 of a saddle 9, see Fig. 8, so that the saddle is pivotally mounted to swing freely in a plane parallel with the longer side of the casing. Each one of these saddles, loops or clevises 9 is provided with a substantially V shaped bearing 10 to receive a correspondingly shaped knife edge of one of the weighing levers. By reference to Fig. 8 it will be noted that each clevis consists of two spaced apart sides, which terminate in ears 8, and also the bottom of the clevis is provided with outstanding lugs 11 terminating in upstanding portions 12, thereby forming a cradle at that portion of the clevis opposite the ears 8. This cradle forms a seat for the bearing 10, see Fig. 9 so that the bearing can not drop out of the clevis. Means is provided for permitting the bearing to universally rock in its seat in the clevis. One manner of accomplishing this is by providing the bearing with a rounded surface on its bottom so that it can rock on a plane transverse to the pivotal swinging plane of the clevis or loop on the pin 7. In the construction illustrated the bearing 10 is provided with a conical or ball shaped bottom surface adapted to rock on a punched up conical bearing or a cup shaped bearing 13 formed on the upper face of the bottom member 14 of the clevis. This construction will permit the bearing to rock freely in any direction.

Means is also provided for reducing the friction or drag between the bearing and the clevis so that the bearing can move freely in the clevis. In addition the bearing carrying clevis 9 has its inside walls 15 hardened by tempering, and these walls engage a knife like edge 16 of the bearing. To provide this knife like edge the bearing has its end wall slanted outwardly so that only a knife edge portion of the end wall of the bearing engages the inside walls of the clevis thereby reducing friction, particularly when the load is imposed upon the scale. This assures more accurate weighing, since the high spot on the side wall of the knife edge is the only point which the clevis can possibly touch during the swinging movement. Inasmuch as the four clevises and bearings are identical, the foregoing description of one is thought to be sufficient.

The V shaped pocket 17 of the bearing 10 as shown in Fig. 9 is constructed and arranged to receive a knife edge 18 formed on the under side of each of the levers 19, see Fig. 4 of the drawings. There are two of these levers 19 arranged on opposite sides of the casing 1. Each of these levers has a central arm and two branch arms, 20 and 21, and each of the arms 21 carries one of the knife edges 18 on its outer end and on its under surface. In addition, each of the branch arms 20 and 21 carries another knife edge 22 formed on its upper surface as shown in Fig. 4. Thus there are four of the knife edges 18 and four of the knife edges 22 carried by the two levers 19, and these knife edges are arranged in opposed pairs. Each of the knife edges 18 rests on one of the bearings 10 for support. Thus the outer ends 20 and 21 of each of the levers 19 is pivotally mounted upon the brackets 5.

Means is provided for supporting the platform from the knife edges 22. To this end a set of clevises and bearings and pins similar to those disclosed in Figs. 7, 8 and 9 and heretofore described are provided. These clevises are arranged in inverted relation as shown in Fig. 4 and Fig. 10 of the drawings, and each consists of a clevis 24, having perforated ears 25, through which pass pins 26. The upper portion of the clevis 27 is provided with a downwardly disposed punched in conical tit 28, upon which is mounted a bearing 29, constructed for universal movement with reference to bearing 10 and the clevis 9. By reference to Figs. 4 and 10 it will be noted that the knife edge 22, which is carried on the upper surface of the lever 20, rests in the V shaped under surface of a bearing 29. The outer wall of the bearing 29 is flared like that heretofore described in connection with the knife edge 16 of bearing 10 shown in Fig. 10, which knife edge engages the inner hardened walls of the clevis 24, to prevent friction. In addition, the knife edge 22 is provided with a similar flaring wall to make contact at a knife like edge 30 with the hardened walls of clevis 24, to also prevent drag. This same constructional arrangement will be found on the knife edge 18 with reference to the inner hardened walls 15 of clevis 9. The pin 26 which projects beyond each end of clevis 24, is adapted to receive open ended slots 31 formed on the extreme lower ends of a plurality of brackets 32 formed on the under surface of platform 2. These brackets 32 are arranged at substantially each corner of the platform so that the platform is supported at four points from the four pins 26 carried by the four clevises 24, which are in turn carried by the four levers 20 and 21, in turn carried by the brackets 5 of the casing. These connections provide a series of knife edge mountings for the two levers 19, which knife edges are constructed and arranged to eliminate friction and to provide a swinging mounting for the levers, and which swinging mountings provide universality of movement of the lever arms in the brackets 5.

The casing 1 houses the transverse lever 33, one end of which projects into the extension 3 of the casing and is operatively connected with the indicating dial. To this end the casing is provided with a support 34, which may be a part of the casing wall and which is in turn provided with an upstanding bracket 35 formed with bifurcations 36 which provide a seat for opposed V shaped bearings adapted to receive a knife edge 38 transversely disposed on lever 33. By this means the lever 33 is mounted in pivoted position.

In addition, means is provided in the form of a knife edge mounting for connecting the inner ends of the levers 19 to the lever 33. This is accomplished by the two clevises 39 and 40, see Figs. 3 and 4. These clevises may be similar to those heretofore described or they may be in the form illustrated comprising a link shaped rod adapted to receive in its upper end the knife edge bearing 41 and in its lower portion a bearing 42. This upper bearing is provided with a V shaped seat adapted to form a bearing for a knife edge 43 transversely mounted on lever 33. The knife edge 43 projects on either side of lever 33 and the bearings 39 and 40 are mounted on each free end of the knife edge 43. The bearing 42 is provided with a cup shaped recess or conical seat, adapted to receive a conical knife edge 44 carried by the under side of each of the levers 19. These knife edges and bearings are preferably hardened and by means of this construction there is universal movement between the conical point or bearings on the central arms of levers and the loops or clevises carried by the knife edge of the central transverse lever 33. This lever 33 is provided with a counter-weight 45 for the purpose of counteracting the weight of the opposite end of the lever and also for keeping tension on a strong vertical coil spring 46 mounted in the latter extension of the base, which will hereinafter be more fully described.

By arranging the transverse lever 33 pivoted at 38 the clevises 42 forming the connection between the platform and the lever, as disclosed in the drawings, it is possible to connect the relatively small coil spring 46, as shown clearly in Fig. 3. This connection is formed by the knife edge 47 projecting laterally from the end 48 of lever 43 and engaging a co-operating stirrup 49 provided with an eye 50 connected to the upper end of the coil spring. The lower end of the coil spring is connected to the lower arm 51 of an L-shaped or bell crank lever by means of a threaded screw 52 having a threaded portion which adjustably engages within the convolutions of the spring 46. This threaded screw is adapted to be adjusted by means of the usual cross slot 53, which projects downwardly and is accessible from the bottom part of the casing through an aperture in the plate closing the bottom of the casing and the extension. This aperture may be covered by a seal to prevent tampering with the adjustment. The L shaped lever having the lower arm 51 is pivotally mounted in a bracket 54 on the side of the extension 3, and the upper or vertical arm 55 of the L shaped lever is adjustably engaged by means of screw 56, which threads through the side of the extension 3, so that by adjusting the screw inwardly or outwardly, the vertical arm of the L shaped lever may be adjusted forwardly or rearwardly, to increase or decrease the tension on the spring 46, thereby to control the initial position of the outer end of the lever arm, and by suitable connections therefrom to the rack bar, the initial position of the rack bar.

The outer end 48 of the transversely disposed lever 33 is adjustably connected to another bell crank 56' pivotally mounted at 57 on a bracket 58 on the frame. This adjustment is accomplished by providing the lower arm 59 of the bell crank with a pivotal connection 60 to a link 61, the upper end of which is pivotally connected as at 62, with a bifurcated piece 63, which is formed with a slotted extension 64 adjustably connected as by means of the screws 65, with the end 48 of the transversely disposed lever 33. By loosening the screws and sliding the slotted piece relatively to the end 48 of the lever, the initial position of the bell crank lever relative to the transversely disposed lever 33 may be adjusted. The bell crank lever 56' is preferably formed having its arms arranged at less than a ninety degree angle. The long arm of the bell crank lever 56' is provided with a pin 66, which engages a spring 67 connected as by means of a hook 68 to the front face of the extension 3. This spring urges the vertical arc of the lever toward the wall of the extension 3.

The upper end of the bell crank lever is bifurcated, forming two upstanding ears 78 and 79", and carries with a pivoted pin 66' on which is mounted a rack 70. This rack is provided at its forward end with teeth 71, geared to a pinion 72, mounted on a spindle 73. The rear end of the rack 70 is formed as a rod and carries a weight 74 adjustably held by a screw 75. This weight is arranged to counteract the weight of the forward toothed portion of the rack and to prevent drag of the rack in the bearing during the reciprocatory movement of the rack. Spring means is provided for yieldingly maintaining the rack in mesh with the pinion to prevent back leash. This spring means is arranged to eliminate undue friction between the rack and the pinion and preferably consists of and arrangement of leaf springs as shown in the drawings. In the construction illustrated, a leaf spring 76 is connected as at 77 to the rear end of the rack and a forward portion of the spring 76 presses against a knife edge 79 formed on the ear 78 which forms a bearing for the pivot pin 66' on which the rack 70 is mounted. As illustrated, this knife edge 79 is disposed slightly forward of the pivotal axis in a direction toward the pinion 72, by which arrangement the spring 76 tends to force the teeth 71 of the rack yieldingly into mesh with the teeth of the pinion 72. An additional leaf spring 80 is mounted as at 81 on the forward portion of the rack and this spring 80 extends rearwardly and also engages the knife edge 79 slightly below the point of engagement of the spring 76 with the knife edge. By means of these two springs 76 and 80 a very fine adjustment can be made of the pressure of the rack against the pinion. One of the features of this leaf spring construction resides in the fact that the springs 76 and 80 are bodily movable with the rack as the latter moves forwardly and backwardly during a weighing operation. The springs are not anchored to any fixed part of the casing and therefore is not put under tension, due to the reciprocation of the rack 71. It will be noted that the ear 78 is provided with a knife edge 79' against which the rack 70 is normally pressed by the springs 76 and 80. This necessitates that the rack 70 be loosely mounted upon the pivot 66' between the two upstanding ears 78 and 79". Since the force of the springs is exerted at the point of the knife edge 79, which is slightly in advance of the knife edge portion 79' against which the rack 70 is forced by the springs, there is a turning movement exerted upon the rack about the inner knife edge 79' of the bearing 79, which forces the teeth of the rack 71 into yielding mesh with the pinion.

By having the knife edge 79 on the outer face of the upstanding ear or bearing 78 and spaced from the pin 66' on which the rack 70 is pivotally mounted, the frictional drag is reduced to a minimum. For instance, if this outer knife edge 79 were located more forward, in a direction toward the pinion, there would be a greater drag on the rack because when the rack moves forward its rear weighted end sinks slightly, and the springs move or wipe in a radial arc across the upstanding knife edge 79 on the outer face of the bearing 78. Of course, by having this knife edge 79 nearer to the pinion, the strength of the spring is increased, but by doing this the drag would be relatively increased, which is undesirable. By locating this knife edge close to the axial pin and forwardly thereof, sufficient spring strength is supplied and the friction between the leaf springs and the outer knife edge 79, due to the wiping movement of the spring over the knife edge, is reduced to a minimum.

The upper end of the pinion shaft 73 is provided with a pointer or indicator 82, adapted to oscillate over a scale dial 83 provided on its periphery with calibrations 84. The dial plate 83 is in turn mounted on a shallow recessed scale pan 85 formed in its periphery with a circumferential recess 86 adapted to receive a packing 87 on which rests a glass 88. A split circumferential sealing ring 89 clampingly engages the under side of the shallow pan 85 and engages the periphery of the glass 88. This forms a water tight sealing for preventing the entrance of water in the recording mechanism.

Referring to Figs. 4 and 10, it will be noted that the cross pin 26 passes beneath the lower portion of the lever 20 rather snugly and with such small amount of play that the clevis 27 through which the pin passes cannot rise high enough to permit the bearing 29 disengaging from the upper face of the knife edge 30. This construction therefore not only prevents disengagement of the bearing from the knife edge, but also locks the clevis 27 onto the lever 20, while at the same time permitting free swinging movement of the clevis without rubbing against the lever.

By reference to the drawings it will be noted that the pins 7 which pass through registering apertures in the brackets 5 for swingingly supporting the clevises or saddles 9 must be constructed and arranged so that these pins cannot be inadvertently displaced. A simple means is provided for this purpose. To this end the pins 7 are provided with heads which are disposed between the brackets 5 and the inner face of the wall of the casing 1 and the pins are held from outward movement by contact with the pin head with the wall of the casing and are held from reverse movement because the pin head is larger than the aperture in the bracket. This will lock the clevises 9 in position in the brackets. A modification of this arrangement for locking the pins 26 in position on the clevises 24 and depending brackets 32 from the platform 2, is shown in Fig. 10. In this case the spaced depending arms 32 carried on the under side of the platform 2 are slotted as at 31 to receive through the same the pin 26, which pin is provided with a head which in turn is confined by a guard 31' riveted to one of the arms 32. In assembling this device the platform 2 will be merely dropped down upon pins 26, the extremities of which pins extend through the sides of the clevis or loop 24, the latter being mounted on the suspended knife edge of the lever 20. This construction locks the pivotal pin in position.

Means is provided for preventing any of the clevises or levers from becoming detached from the base. In the present instance, this means comprises one or more stops 90, preferably one at each end of the base, the same being mounted on the side of the base and depending or straddling the upper edge and formed with a downwardly depending lip 91 adapted to engage a screw 92 mounted on a bracket 93 on the under side of the platform. The play between the screw and this downwardly depending lip is just enough to prevent detachment of the scale platform 2 from the casing 1. This prevents detachment of the stirrups or clevises, while at the same time permitting the free depression of the platform during the weighing operation. The screw is made adjustable so that by unscrewing it, the screw will not contact with bracket 93, which permits detachment of the scale platform.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described, the combination of a substantially shallow casing adapted to rest on the floor and having a platform supporting portion of substantial area and open at its top to receive a weighing platform, said casing having a lateral extension, a registering mechanism, including a dial closing the top of said extension and lying substantially in the plane of the platform, a plurality of levers horizontally disposed in the casing beneath the platform, said levers being supported by said casing and operative connections from said levers to said registering mechanism, including a spring for actuating said registering mechanism upon the movement of said platform.

2. In a device of the class described, the combination of a relatively shallow casing formed with an extension, a platform mounted in and closing the top of said casing, a registering mechanism including a dial closing the top of said extension, a plurality of levers horizontally mounted in said casing and supported by the walls thereof, said levers being operatively connected to said platform, a lever transversely disposed in said casing and projecting into said extension, said lever being pivotally mounted on said casing and being normally horizontally disposed therein, connections from the first mentioned levers to said lever, and connections from the end of said lever in said extension to the registering mechanism therein for actuating the registering mechanism on movement of the platform.

3. In a device of the class described, the combination of a relatively shallow casing provided with an extension, a plurality of brackets carried by the opposing sides of said casing, a plurality of levers shiftably mounted in said brackets, said levers lying horizontal in said casing, a platform for the top of said casing and shiftably mounted on said levers, a relatively long lever horizontally disposed in said casing adjacent said horizontal levers, and projecting into said extension, said relatively long lever having a pivotal mounting carried by said casing, shiftable connections from said relatively long lever to said horizontal levers, registering mechanism including a dial for the top of said extension, and operative connections from the end of said relatively long lever in said extension to said registering mechanism for actuating the recording mechanism on the movement of said platform.

4. In a device of the class described, the combination of a relatively shallow casing, a plurality of levers horizontally disposed in said casing and carried by the walls thereof, a relatively long lever horizontally disposed in said casing transversely of said plurality of levers, said relatively long lever being pivotally mounted on said casing, connections from said plurality of levers to said relatively long lever, a platform closing a portion of the top of said casing and connected to said plurality of levers, a registering mechanism including a dial closing a portion of the top of said casing and operatively connected to the projecting end of said relatively long lever.

5. In a device of the class described, the combination of a substantially shallow casing having an extension, a plurality of levers horizontally disposed in said casing and carried by the walls thereof, a relatively long lever pivoted in said casing and lying horizontal therein, and transversely disposed to said plurality of levers, said relatively long lever having its arm projecting into said extension, a platform closing the top of said casing and connected to said plurality of levers, a bell crank lever having an arm normally substantially vertically disposed in said extension and an arm normally substantially horizontally disposed in said extension, a vertical link connecting the free end of said horizontal arm of said lever with the free end of said relatively long lever, a rack shiftable horizontally in said extension, a connection from said rack to the free end of said vertical lever of said bell crank, a vertical pinion in said extension operatively connected with said rack, a relatively small coil spring vertically disposed in said extension and having its upper end connected to the end of said relatively long lever and having its lower end mounted on said extension, and a registering dial closing the top of said extension, a pointer on the upper end of said vertical pinion shaft, said pointer being adapted to move over said dial upon the actuation of the scale platform.

6. In a device of the class described, the combination of a relatively shallow casing, a plurality of levers horizontally disposed in said casing and carried by the wall thereof, a relatively long lever pivotally mounted in said casing and lying adjacent said plurality of levers, said relatively long lever being disposed transversely to said plurality of levers, connections from the shorter arm of said relatively long lever to said plurality of levers, a platform disposed at the top of said casing and lying substantially in the plane of the top thereof, connections from said platform to said plurality of levers, a bell crank pivotally carried by said casing, the point of pivot of said bell crank lying below the longer arm of said transversely disposed lever, said bell crank having a vertical arm, the upper end of which extends substantially in the plane at the top edge of the casing, connections from the free end of the long arm of said lever to the lower arm of said bell crank, a coil spring connected to the long arm of said lever, the other end of said coil spring having a connection to said casing, a dial adjacent the top of said casing and lying substantially in a common plane with the scale platform, a dial shaft passing through said dial, a pinion on said shaft, a rack bar reciprocably connected to said pinion and connected to the upper end of the vertical arm of said bell crank.

7. In a device of the class described, the combination of a relatively shallow casing adapted to be supported on the floor, a plurality of levers pivotally mounted on said casing, said levers lying horizontally within said casing, a platform adjacent the top of said casing and lying substantially in the plane of the top walls of said casing, and connections from said platform to said levers, a registering mechanism including a scale dial, said scale dial being adjacent the top of said extension and lying substantially in the plane of the scale platform, a coil spring vertically disposed in said extension and connected at its upper end to one of said levers, said coil spring being mounted on said casing, and lever mechanism mounted in the lowermost portion of the walls of said casing, a pointer shaft passing through said scale dial, a pointer on said shaft, a pinion on said pointer shaft, a rack meshing with said pinion, connections from said rack to said lever mechanism, and connections from said lever mechanism to said coil spring.

8. In a device of the class described, the combination of a substantially shallow casing adapted to rest on the floor, operating mechanism mounted in said casing, a weighing platform of substantial area and a scale dial, a shiftable member mounted adjacent said scale dial, and means for mounting said platform and dial on said casing, so as to lie substantially in the same horizontal plane with the top of said casing, and actuating connections from said operating mechanism to the shiftable member of said scale dial.

9. A scale for weighing persons, comprising, a shallow casing, operating mechanism housed within said casing, and a weighing platform and dial lying substantially in the uppermost plane of said casing.

10. A scale for weighing persons, comprising a relatively broad shallow casing, operating mechanism housed within said casing, a weighing platform of substantial area, and a scale dial of substantial area lying in substantially the same horizontal plane and forming a closure for the top of said casing.

11. A scale for weighing persons, comprising, a shallow casing having a relatively broad rectangular portion and a relatively smaller portion projecting laterally from said rectangular portion, operating mechanism housed in said rectangular and projecting portions of said casing, a platform of relatively large area enclosing the top of said rectangular portion of said casing, said platform being recessed adjacent said extension, and a scale dial enclosing the top of said extension and lying in substantially the same horizontal plane with said platform, with the edge of said dial projecting into the extension of said platform and slightly spaced out of contact therewith.

12. In a device of the class described, the combination of a casing including a registering mechanism, a plurality of opposed brackets carried by said casing, a pivotal pin carried by each bracket, a clevis swingingly suspended from each pivotal pin, each clevis carrying a V shaped bearing therein, a knife edge on the under side of the free end of each lever mounted in said V shaped bearing, whereby the free end of said lever is swingingly and freely suspended from said bracket, a second knife edge mounted on the upper face of each lever, an inverted clevis having a V shaped bearing in its uppermost portion superimposed over each second knife edge, each inverted clevis having depending arms, a pivotal pin passing through perforations in said arms and beneath each lever, said pivotal pins having projecting ends, a scale platform having a plurality of depending legs formed with bearings adapted to receive said pins whereby said platform is swingingly mounted from said casing, and connections from said levers to said recording mechanism.

13. In a device of the class described, the combination of a casing, including a registering mechanism, a plurality of brackets carried by said casing, a clevis swingingly mounted in each bracket, a V shaped bearing rockably mounted in each clevis, each said V shaped bearing having sides forming substantial knife edges adapted to engage the hardened walls of said clevises, a knife edge on each lever seated in said V shaped bearing, a scale platform, means for swingingly supporting said scale platform from said levers, and connections from said levers to the registering mechanism.

14. In a device of the class described, the combination of a casing, including a registering mechanism, a plurality of levers mounted in said casing and connected to said registering mechanism, a scale platform mounted on said levers, said mounting including a swinging clevis having a rockably mounted V shaped bearing therein, said V shaped bearing having knife edges contacting hardened walls of said clevis, and said V shaped bearing being adapted to receive a knife edge of said lever.

15. In a device of the class described, the combination of a casing, including a registering mechanism, a plurality of levers mounted in said casing and connected to said registering mechanism, a scale platform mounted on said levers, said mounting including a swinging clevis having a rockably mounted V shaped bearing therein, said V shaped bearing having knife edges contacting hardened walls of said clevis, and said V shaped bearing being adapted to receive a knife edge of said lever, and means for preventing inadvertent displacement of said bearing from said clevis.

16. In a device of the class described, the combination of a casing, including a registering mechanism, a plurality of levers mounted in said casing and connected to said recording mechanism, a scale platform mounted on said levers, said mounting including a swinging clevis having a rockably mounted V shaped bearing therein, and said V shaped bearing being adapted to receive a knife edge of said lever, and means for preventing displacement of said clevis and knife edge bearing from the knife edge of said lever.

17. In a device of the class described, the combination of a casing, a plurality of brackets mounted thereon having registering bearings, a pin passing through each bearing and engaging the end wall of the casing to prevent endwise displacement of said pin, a clevis swingingly mounted on each pin, said clevis carrying a V shaped bearing, a plurality of levers mounted in said casing, each lever provided with a knife edge resting in each V shaped bearing, each of said levers having a second invertedly disposed knife edge, a plurality of invertedly disposed clevises, each carrying a knife edge bearing resting on the inverted knife edge of each lever, said second clevises depending from each lever and provided with pivotal pins, said pivotal pins passing through each clevis and engaging the end wall of the casing, a scale platform having depending arms formed with bearings adapted to engage projected ends of said pins, whereby to swingingly support the platform from said pins, and operative connection from said plurality of levers to the registering mechanism.

18. In a device of the class described, the combination of a casing, a plurality of brackets mounted thereon having registering bearings, a pin passing through each bearing and engaging the end wall of the casing to prevent endwise displacement of said pin, a clevis swingingly mounted on each pin, said clevis carrying a V shaped bearing, a plurality of levers mounted in said casing, each lever provided with a knife edge resting in such V shaped bearing, each of said levers having a second invertedly disposed knife edge, a plurality of invertedly disposed clevises, each carrying a knife edge bearing resting on the inverted knife edge of each lever, said second clevises depending from each lever and provided with pivotal pins, said pivotal pins passing through each clevis and engaging the end wall of the casing, a scale platform having depending arms formed with bearings adapted to engage projected ends of said pins, whereby to swingingly support the platform from said pins, an operative connection from said plurality of levers to the recording mechanism, said scale platform and casing having interengaging means to limit the upward movement of said platform while permitting its free depression during the registering operation, said interengaging means being constructed and arranged to hold said clevises and levers in assembled position within said scale.

19. In a device of the class described, the combination of a casing provided with a registering mechanism, including a dial, a plurality of levers swingably mounted in a horizontal position in said casing, a relatively long transverse lever horizontally and pivotally mounted in said casing, a plurality of knife edges carried by the shorter arm of said transverse lever, a clevis having V shaped bearings lying over said knife edge, said clevis depending therefrom and provided with a substantially cup shaped bearing below said knife edge, a substantially conical knife edge carried by each lever, each conical knife edge lying in a cup shaped bearing, and connections from the longer arm of said transverse lever to said registering mechanism.

20. In a device of the class described, the combination of a casing provided with registering mechanism, opposing levers swingingly mounted from the opposite ends of said casing, said levers being horizontally disposed therein, a transverse lever pivotally mounted in said casing and horizontally disposed over the inner ends of said opposed levers, opposing knife edges carried by the shorter arm of said transverse lever, a clevis having an inverted V shaped bearing superimposed on a knife edge, each clevis having a cup shaped bearing disposed beneath said knife edge, the free inner end of each opposed lever having a conical knife edge supported in the cup shaped bearing of each depending clevis, and an actuating connection from the longer arm of said transverse lever to said registering mechanism.

21. In a device of the class described, the combination of a casing provided with registering mechanism, having a plurality of levers swingingly suspended therein, a platform mounted on said levers, a transverse lever pivotally mounted on said casing and having its longer arm projecting into an extension on said casing, connections from the shorter arm of said transverse lever to said plurality of levers, said transverse lever being substantially horizontal, a bell crank lever pivotally mounted in said extension to swing in a plane parallel to the plane of projection of said transverse lever, said bell crank lever having a substantially vertically disposed arm and a substantially horizontally disposed arm when in normal position, a slotted member having a bifurcated end adjustably carried as by means of screws on the free end of the relatively long arm of said transverse lever, a link pivotally mounted between the furcation of said link, said link lying substantially vertical and pivotally connected to the free end of the horizontal arm of said bell crank lever, a spring connected to the vertical arm of said bell crank lever and to the wall of said extension, a vertically disposed coil spring connected to the end of the relatively long arm of the said transverse lever, a bell crank lever pivotally mounted on the wall of said extension, and provided with a substantially horizontal arm adjustably connected to the lower end of said coil spring, a screw passing through the end of said extension and adjustably engaging the vertical arm of said second bell crank lever, and means connected with the vertical arm of said first mentioned bell crank lever for actuating the registering mechanism.

22. In a device of the class described, the combination of a casing provided with an extension, a transversely disposed lever pivotally mounted in said casing and lying horizontally therein, with its longer arm projecting into said extension, a plurality of levers in said casing and connected with the shorter arm of said transversely disposed lever, a scale platform suspended from said plurality of levers, a bracket on said extension, a vertical shaft thereon, a pinion on said shaft, a registering member on said shaft, a rack reciprocably mounted on said extension and having its teeth engage said pinion, a lever pivotally mounted on said extension and having an end pivotally connected to said rack, means connected to the long arm of said transversely disposed lever for shifting said second lever, and spring means carried by said rack and engaging the bearing forming the pivotal connection between said lever and said rack at a point between said pivotal connection and the point of engagement of said rack and pinion, yieldingly forcing the teeth of said rack into engagement with the teeth of said pinion.

23. In a device of the class described, the combination of a casing, a registering mechanism therein including an upstanding spindle, a pinion on said spindle, and a rack reciprocably mounted and meshing with said pinion, a lever pivotally mounted on said casing and provided with a bifurcated upper bearing, a pin passing through the furcations of said bearing, said rack being pivotally mounted on said pin and loosely slidable laterally between said furcations, a scale platform mounted on said casing, an operative connection between said platform and said lever for shifting the latter on the actuation of the scale platform, spring mechanism for yieldingly forcing said rack into engagement with the teeth of the pinion comprising a knife edge on one of the furcations of said upstanding bearing, said knife edge being located in advance of the pivotal pin in a direction toward the pinion, and a spring connected to the rear end of said rack and pressing against said knife edge.

24. In a device of the class described, the combination of a casing, a registering mechanism therein including an upstanding spindle, a pinion on said spindle, and a rack reciprocably mounted and meshing with said pinion, a lever pivotally mounted on said casing and provided with a bifurcated upper bearing, a pin passing through the furcations of said bearing, said rack being pivotally mounted on said pin and loosely slidable laterally between said furcations, a scale platform mounted on said casing, an operative connection between said platform and said lever for shifting the latter on the actuation of the scale platform, spring mechanism for yieldingly forcing said rack into engagement with the teeth of the pinion, comprising a knife edge on one of the furcations of said upstanding bearing, said knife edge being located in advance of the pivotal pin in a direction toward the pinion, and a spring connected to the rear end of said rack and pressing against said knife edge, and a second spring connected to the rack at a point well in advance of the pivotal pin, said second spring bearing against said knife edge.

25. In a device of the class described, the combination of a casing provided with a weighing platform and a scale pan, said scale pan having a peripheral upstanding flange forming a central recess and having a lateral extension terminating in an upstanding circumferential lip, a scale dial disposed in said central recess, a pointer adapted to be shiftably mounted to swing over said dial face, said lateral extension having a packing thereon and a transparent plate resting on said packing enclosing the aperture circumscribed by the upstanding lip, and a sealing ring surrounding the joint between the glass and the scale pan, whereby to prevent the access of moisture and dust to said scale dial, and actuating connections between the scale platform and said pointer.

26. In a device of the class described the combination of a casing, a weighing mechanism within said casing including a lever, a knife edge on said lever, a stirrup carrying a V-shaped bearing mounted on said knife edge, said stirrup having registering bores, a headed rivet having the shank of said rivet passing through said bores whereby the head of the rivet prevents endwise movement of the rivet in one direction, a scale platform for said casing, said scale platform having depending legs with open ended slots constructed and arranged to straddle the free ends of said rivet whereby said platform is swingingly carried from said lever, one of said legs depending from said scale platform having a stop engaging the head of said rivet to prevent endwise movement of said rivet.

27. In a device of the class described, the combination of a relatively shallow casing having a portion projecting laterally thereof, a platform and dial lying in substantially the same horizontal plane and disposed at the top of said casing, a plurality of levers horizontally mounted in said casing and supported by the walls thereof, said levers being operatively connected to said platform, a horizontal lever disposed transversely to said first mentioned levers and having a portion lying in said casing and connected to said levers, and another portion lying in said lateral projection and an operative connection from said lever to a shiftable member of said scale dial.

28. A clevis and bearing for a weighing scale, comprising, spaced-apart members, having a cross member forming a seat, a V-shaped bearing mounted in said seat adjacent spaces of said spaced-apart members, being suitably hardened to co-operate with the lateral faces of a knife edge adapted to be seated in said V-shaped bearing.

29. In a weighing scale, the combination of a shallow casing, a weighing platform and a dial disposed adjacent the top of said casing and lying in a substantially common horizontal plane, a plurality of levers arranged in said casing beneath the weighing platform, a relatively long lever pivotally mounted on said platform and lying transversely the length of said first mentioned lever, connections from said levers to the short arm of said relatively long lever, a bell crank lever pivotally mounted at the bottom of said casing adjacent the end of the relatively long arm of said lever, a link from the bottom end of said bell crank lever to the free end of the long arm of said lever, a coil spring having one end attached to the lowermost part of said casing adjacent said bell crank with the upper end of said coil spring connected with the long arm of said lever adjacent its end, a rack disposed adjacent the long arm of said lever and lying in a horizontal plane and connected to the upper end of said bell crank lever, a pinion mounted on a horizontal shaft projecting through a dial and said pinion being connected to the rack, and a pointer on said dial.

30. In a weighing scale, the combination of a supporting casing, a platform and a dial including a vertical shaft having a pinion thereon, a rack meshing with said pinion, means connecting said weighing mechanism and rack, including a bearing having a knife edge, against which said rack is adapted to bear, said bearing having a second knife edge extending in an opposite direction from said first knife edge, said second knife edge lying on the side of said first knife edge adjacent said rack, a spring connected to the rear of said rack and engaging said second knife edge, and a spring connected to the front of said rack intermediate said first knife edge and pinion, said second spring passing through said second knife edge.

31. In a weighing scale, the combination of a casing having a dial and a weighing platform, weighing mechanism in the casing, including a relatively long lever and a bell crank lever, a coil spring connected to said casing and to the free end of said relatively long lever, a link pivotally connected to the lower arm of said bell crank lever, the upper end of said link being connected to a bifurcated bracket, an adjustable connection between said bracket and the free end of said relatively long lever, a rack connected to the upper end of said bell crank lever, a pinion connected to said rack, said pinion having a shaft passing through the dial, and a movable member on said shaft to co-operate with said dial.

MATHIAS J. WEBER.

DISCLAIMER 1,824,698.—*Mathias J. Weber*, Chicago, Ill. COMBINED LEVER AND COIL SPRING TYPE OF SCALE. Patent dated September 22, 1931. Disclaimer filed February 25, 1943, by the assignee, *Continental Scale Corporation*.

Hereby enters this disclaimer to claims 8, 9, and 10 in said specification.

[*Official Gazette March 23, 1943.*]